UNITED STATES PATENT OFFICE.

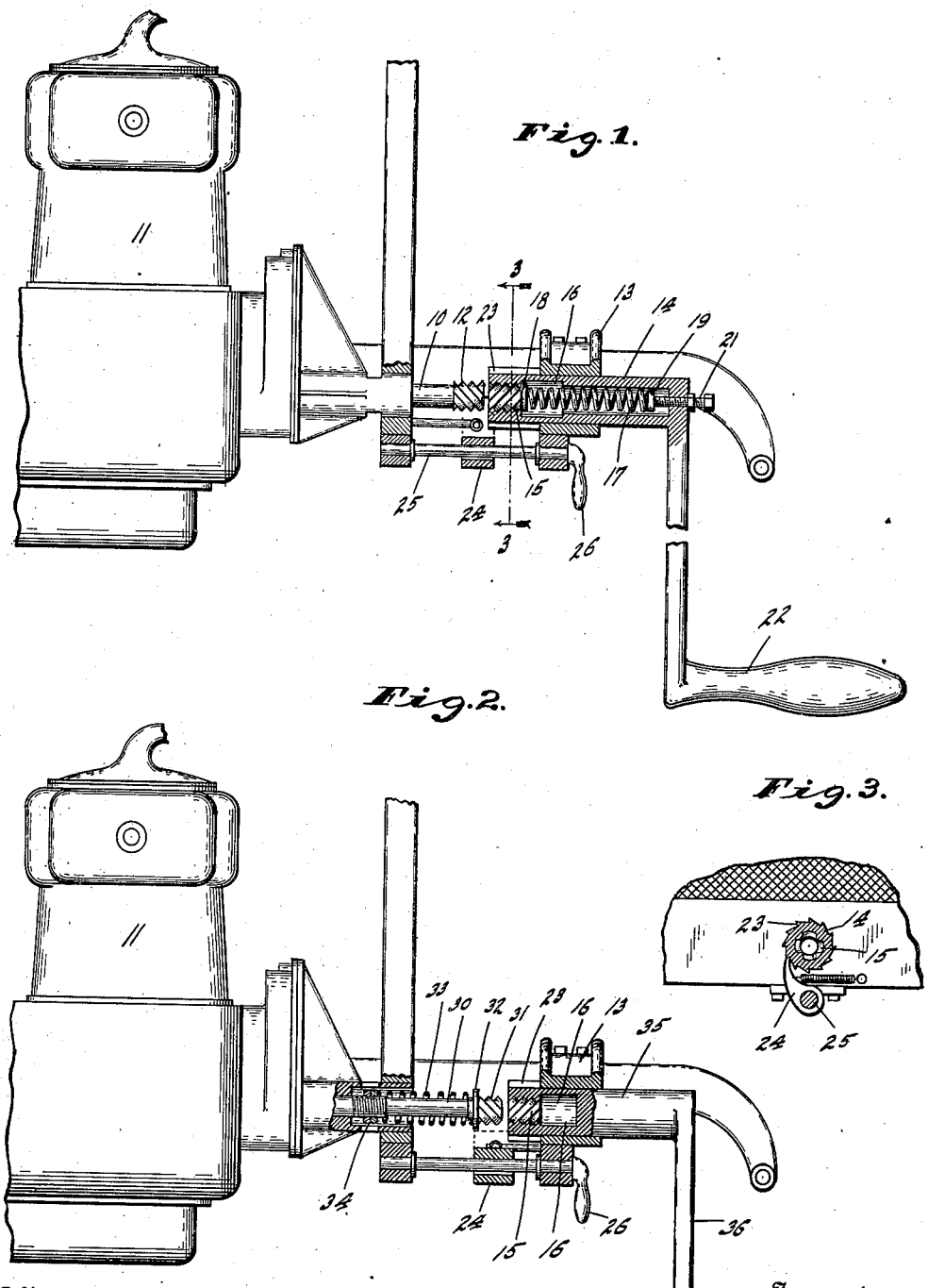

CHARLES E. CARLL, OF INDIANAPOLIS, INDIANA.

ENGINE-STARTING CRANK.

1,001,813.   Specification of Letters Patent.   Patented Aug. 29, 1911.

Application filed July 5, 1910. Serial No. 570,336.

*To all whom it may concern:*

Be it known that I, CHARLES E. CARLL, a citizen of the United States, residing at Indianapolis, in the county of Marion and State of Indiana, have invented a new and useful Engine-Starting Crank, of which the following is a specification.

The object of my invention is to produce an engine starting crank of such character that any back firing of the engine cannot possibly do injury to the operator.

The accompanying drawings illustrate my invention.

Figure 1 is a vertical section of one form of my improved starting crank arranged in position relative to an automobile engine; Fig. 2 a similar view of another form, and Fig. 3 a section on line 3—3 of Fig. 1.

In Fig. 1 of the drawings, 10 indicates the crank shaft (or any other suitable shaft) of the engine 11. Shaft 10 is provided at its end with a plurality of quick-pitch threads 12, preferably four in number so as to facilitate ready entry. Back of thread 12 the shaft 10 is ensmaled as clearly shown in Fig. 1 of the drawings. Journaled in the frame portion 13 in alinement with shaft 10 is the hollow spindle 14 of my improved crank. This spindle at its end is provided with a threaded bore 15 adapted to receive the threads 12 of shaft 10. Beyond threads 15 the bore of the stem 14 is enlarged, as indicated at 16, so that threads 12 may freely rotate therein. Arranged within stem 14 is a heavy spring 17 engaging an abutment plate 18 adjacent the inner ends of threads 15. The opposite end of spring 17 engages an adjustable abutment 19 which may be adjusted by means of a suitable temper screw 21. The spindle 14 is provided with a suitable crank handle 22 by means of which it may be turned. The inner end of spindle 14, surrounding threads 15, is provided with ratchet teeth 23 adapted to be engaged by a retaining pawl 24 carried by a rock-shaft 25 provided at its front end with suitable operating lever 26.

In operation spindle 14 will be shoved inward axially and threads 15 screwed on to threads 12 until the end of shaft 10 engages the abutment plate 18. The force of spring 17 is sufficient to withstand the ordinary compression resistance of the engine and, therefore, the spindle 14 may be freely rotated and the shaft 10 of the engine moved forwardly. If by chance there should be a back fire in the engine, pawl 24 will prevent any backward movement of spindle 14 and, instead, threads 12 will be driven through threads 15 into the enlarged bore 16, the spring 17 yielding under the greater force of the explosion within the engine.

In order to return the parts to normal position, the operator will, when the engine has stopped, retract pawl 24 by means of lever 26 and will turn the spindle 14 in a direction opposite to starting direction so that threads 15 may be backed off from threads 12.

In the form shown in Fig. 2, the engine shaft 30 is provided with the threaded end 31 and back of this threaded end is a movable abutment flange 32 held in place by a spring 33 which surrounds shaft 30. The tension of the spring 33 may be adjusted by means of a suitable abutment nut 34 threaded on shaft 30.

The spindle 35 of the starting crank 36 is journaled in the frame member 13 and is provided, as in the other form, with a ratchet 23, threads 15 and an enlarged inner bore 16. The operation of this form of the device is exactly like that of the form already described, the only difference being that the spring abutment is on the engine shaft instead of in the starting crank.

Of course, if desired, a spring might be mounted both in the starting crank and over the shaft but that would be of no special benefit. It is also to be understood that any proper yielding substitute for the spring may be used without departing from my invention.

I claim as my invention:

1. The combination, with an engine shaft having a thread thereon, of a starting crank alined with said shaft and provided with a mating thread, the said two threads being so formed that one will discharge from the other in either of two axial relations, a ratchet and retaining pawl to normally prevent reverse rotation of the starting crank, and a yielding abutment yieldingly resisting relative axial movement of the two parts beyond engagement during forward rotation of the crank shaft.

2. The combination, with an engine shaft having a thread thereon, of a starting crank alined with said shaft and provided with a mating thread, the said two threads being so formed that one will disengage from the other in either of two axial relations, and a yielding abutment directly yieldingly resisting relative axial movement of the two parts beyond engagement during forward rotation of the crank shaft and axially yieldable an amount equal to the axial distance of engagement of the thread and nut.

In witness whereof, I have hereunto set my hand and seal at Indianapolis, Indiana, this thirtieth day of June, A. D. one thousand nine hundred and ten.

CHARLES E. CARLL. [L. S.]

Witnesses:
ARTHUR M. HOOD,
THOMAS W. MCMEANS.

Copies of this patent may be obtained for five cents each, by addressing the "Commissioner of Patents. Washington, D. C."